United States Patent [19]

Scherch et al.

[11] Patent Number: 5,487,205

[45] Date of Patent: Jan. 30, 1996

[54] WINDSHIELD WIPER BLADE WITH SECURING ROD

[75] Inventors: Richard P. Scherch; Robert E. Neer, both of Urbana, Ohio

[73] Assignee: Grimes Aerospace Company, Columbus, Ohio

[21] Appl. No.: 238,146

[22] Filed: May 4, 1994

Related U.S. Application Data

[63] Continuation of Ser. No. 992,588, Dec. 18, 1992, abandoned.

[51] Int. Cl.⁶ .................................................. B60S 1/38
[52] U.S. Cl. ............................ 15/250.31; 15/250.48; 15/250.452; 15/250.46
[58] Field of Search .................... 15/250.36, 250.41, 15/250.42, 250.05, 250.38, 250.39, 250.40, 250.31, 245, 250.33, 172, 176.1, 176.2, 176.3, 176.4, 176.5, 176.6, 250.32; 403/343

[56] References Cited

U.S. PATENT DOCUMENTS

| | | | |
|---|---|---|---|
| 1,028,182 | 6/1912 | Bemis | 15/176.3 |
| 1,675,816 | 7/1928 | Mokma | 15/250.04 |
| 1,748,755 | 2/1930 | Cogswell | 15/250.36 |
| 1,755,059 | 4/1930 | Gallagher, Jr. | 15/250.04 |
| 1,825,376 | 9/1931 | Vaughn | 15/250.36 |
| 1,853,715 | 4/1932 | Anderson | 15/250.04 |
| 1,868,783 | 7/1932 | Williams | 15/250.04 |
| 1,888,326 | 11/1932 | Mullen | 15/250.04 |
| 2,169,206 | 8/1939 | Krongold | 15/245 |
| 2,240,369 | 4/1941 | Horton | 15/250.32 |
| 2,343,843 | 3/1944 | Horton | 15/250.36 |
| 2,348,502 | 5/1944 | Smulski | 15/250.40 |
| 2,667,657 | 2/1954 | Sivacek | 15/250.32 |
| 2,755,499 | 7/1956 | Mays | 15/250.06 |
| 2,814,820 | 12/1957 | Elliott et al. | 15/250.42 |
| 2,852,796 | 9/1958 | Leins | 15/250.32 |
| 2,908,028 | 10/1959 | Runton et al. | 15/250.36 |
| 2,915,769 | 12/1959 | Ryck | 15/250.42 |
| 2,922,181 | 1/1960 | Krohn | 15/250.42 |
| 2,966,692 | 1/1961 | Zaiger | 15/250.36 |
| 3,031,709 | 5/1962 | Esterling | 15/250.42 |
| 3,099,031 | 7/1963 | Ludwig | 15/250.36 |
| 3,116,506 | 1/1964 | Browne et al. | 15/250.36 |
| 3,121,133 | 2/1964 | Mathues | 15/250.36 |
| 3,121,903 | 2/1964 | Ludwig | 15/250.42 |
| 3,139,644 | 7/1964 | Smith | 15/250.36 |
| 3,304,569 | 2/1967 | Christensen | 15/250.04 |
| 3,480,060 | 11/1969 | Sheldon | 403/343 |
| 3,916,473 | 11/1975 | Williams | 15/250.04 |
| 4,075,730 | 2/1978 | Siemund | 15/250.36 |
| 4,103,384 | 8/1978 | Priesemuth | 15/250.03 |
| 4,622,712 | 11/1986 | Sugita et al. | 15/250.36 |
| 4,698,874 | 10/1987 | Fritz, Jr. | 15/250.33 |
| 4,723,376 | 2/1988 | Blum et al. | 51/165.72 |
| 4,847,940 | 7/1989 | Bradbury | 15/250.40 |
| 4,930,180 | 6/1990 | Longman | 15/250.42 |

FOREIGN PATENT DOCUMENTS

| | | | |
|---|---|---|---|
| 1062783 | 12/1953 | France | 15/250.42 |
| 2253558 | 5/1974 | Germany | 15/250.38 |
| 2515817 | 10/1975 | Germany | 15/250.36 |
| 533392 | 9/1955 | Italy | 15/250.36 |
| 610359 | 10/1960 | Italy | 15/250.42 |

*Primary Examiner*—Gary K. Graham
*Attorney, Agent, or Firm*—Standley & Gilcrest

[57] ABSTRACT

A replaceable windshield wiping element for a windshield wiper system, including an insert end being made relatively rigid in comparison to the windshield contact end of the wiping element so that the insert end may be fastened with a fastener within a holder of the wiper blade assembly.

1 Claim, 3 Drawing Sheets

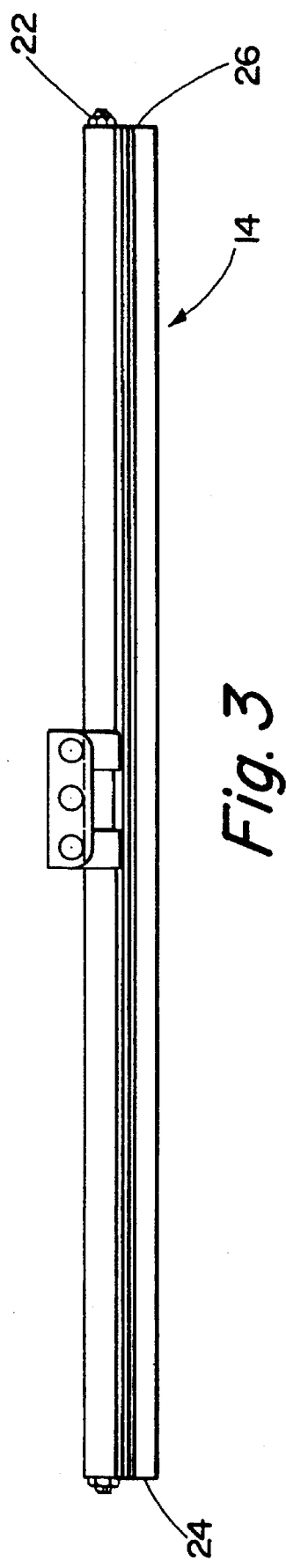
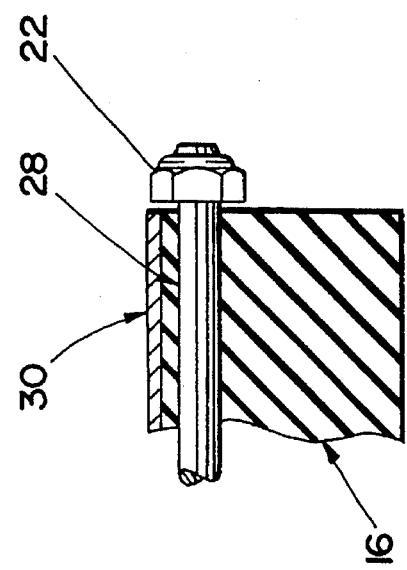
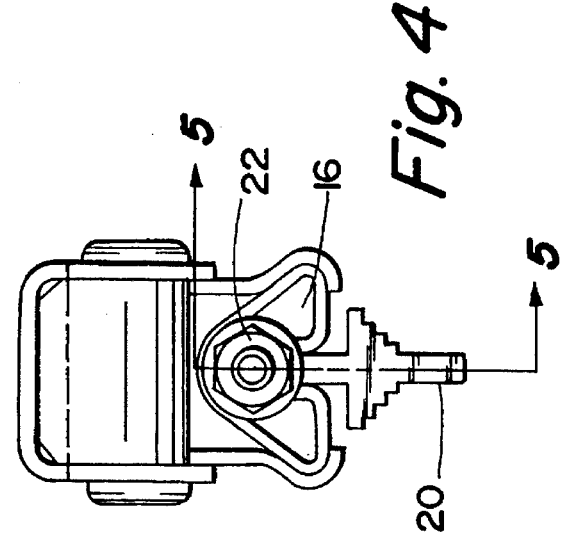

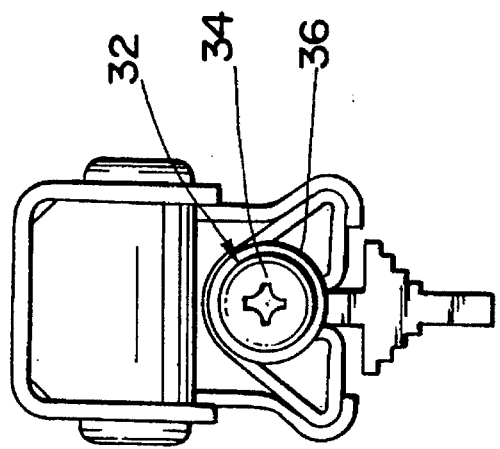
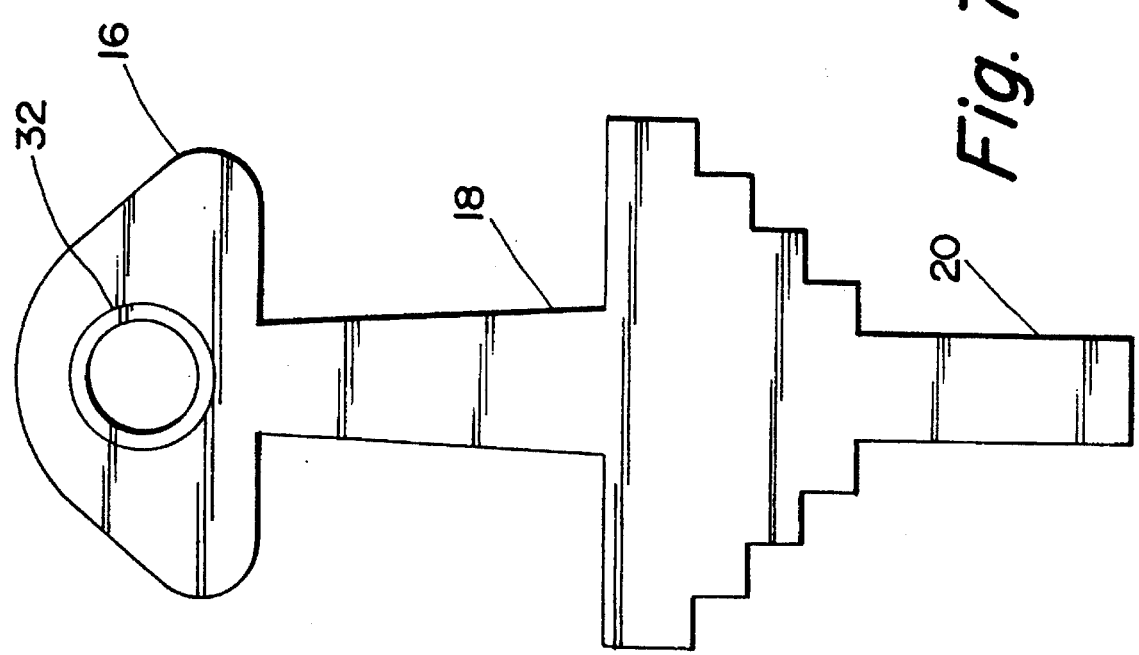

WINDSHIELD WIPER BLADE WITH SECURING ROD

This application is a file wrapper continuation of application Ser. No. 07/992,588 filed Dec. 18, 1992, now abandoned.

BACKGROUND AND SUMMARY OF THE INVENTION

The present invention relates generally to windshield wiper systems and, more particularly, to a windshield wiper system having a replaceable wiping element.

In known windshield wiper systems for aircraft use, and other vehicle wiper systems, the windshield wiper arms typically have permanently attached rubber wiper elements or blades. Due to one particular construction of these known systems, the rubber wiping elements have not been of a replaceable variety. Consequently, when the rubber wiping element was in need of replacement, the entire wiper arm assembly had to be replaced. A need exists to develop a wiper system that has a replaceable wiping element. By doing so, the cost associated with maintaining a windshield wiper system can be substantially reduced.

To have a replaceable wiping element work properly within a windshield wiper system, the element must be capable of being securely retained within the wiping element holder of the wiper arm assembly. To accomplish this, the present invention provides a unitary wiping element having a rigid spine. The rigid spine allows for various securing means to be employed to hold the wiping element in the wiping element holder. In one embodiment of the present invention the rubber wiping element is extended as a dual durometer rubber material. The spine (that portion of the wiping element that is retained within the wiping element holder) is preferably of a high durometer which results in a more rigid structure on the upper portion of the wiping element. This feature allows for easy insertion into the wiping element holder and for installing fasteners into the hard rubber. That portion of the wiping element that is in contact with the windshield is of a lower durometer, more flexible rubber.

In another embodiment of the present invention the spine of the wiping element is formed by extruding rubber over a continuous length of wire or small diameter metal rod. Therefore, the wire or rod will be positioned inside the rubber such that the spine of the element will be of a composite of wire and rubber. Various securing means can then be employed to fasten or otherwise hold the rubber element inside the wiping element holder.

The foregoing and other objects and advantages of the present invention will become more apparent when viewed in light of the accompanying drawings and following detailed description.

BRIEF DESCRIPTION OF THE DRAWINGS

FIG. 3 is a side view of a wiper arm assembly including a replaceable wiping element of the present invention;

FIG. 4 is an end view of the wiper arm assembly of FIG. 3;

FIG. 5 is an enlarged section view taken along the line 5—5 of FIG. 4;

FIG. 7 is an end view of another embodiment of the wiping element of the present invention; and FIG. 8 is an end view similar to that of FIG. 4 having the wiping element of FIG. 7 contained therein.

DESCRIPTION OF PREFERRED EMBODIMENT

Figure 1:
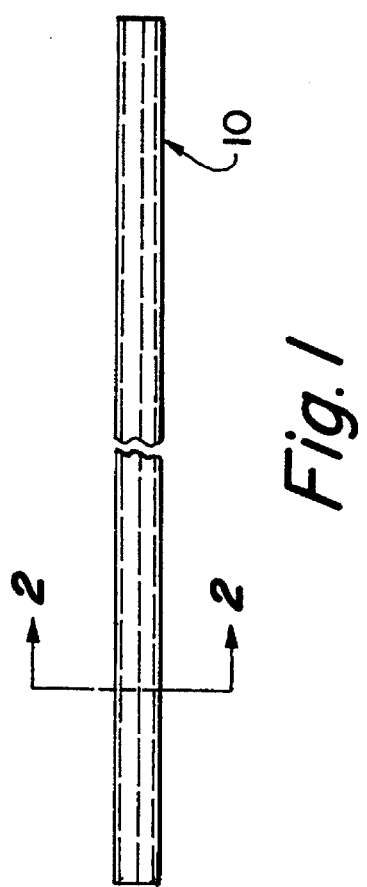
FIG. 1 is a plan view of a typical wiping element holder which is suitable for accommodating the replaceable wiper element of the present invention.
Figure 2:
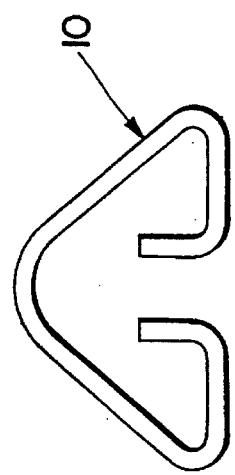
FIG. 2 is a cross section view of the holder of FIG. 1.

Referring now to the drawings, and particularly FIG. 1, there is illustrated a holder 10 for a wiping element 12 of a windshield wiper arm assembly 14. A cross section of the holder 10 is shown in FIG. 2. The holder 10 forms a part of a wiper arm assembly 14 as shown in FIG. 3.

Figure 6:
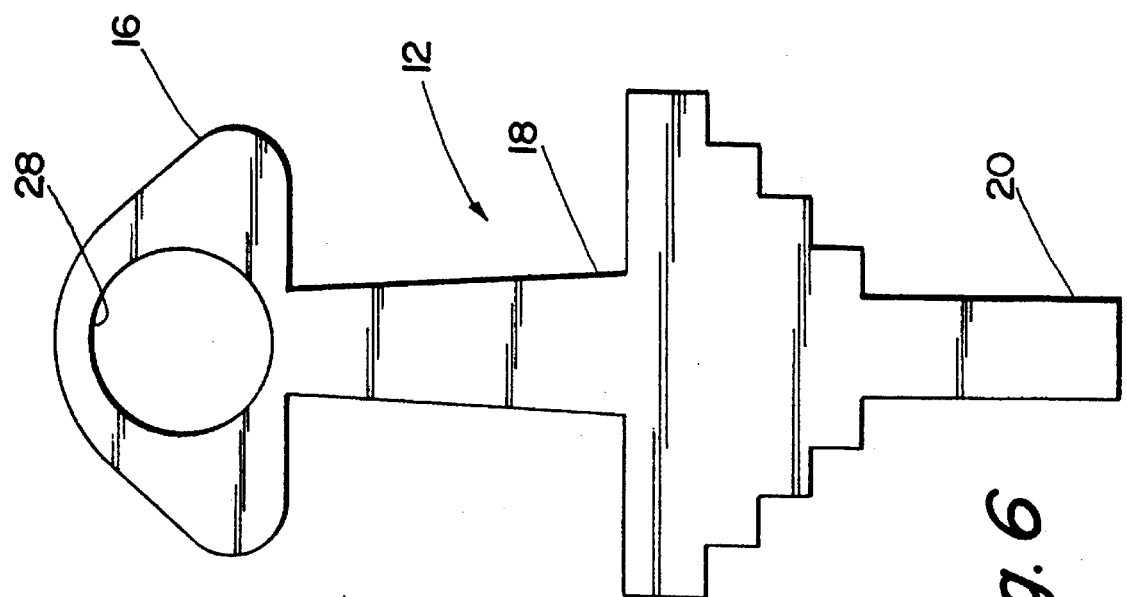
FIG. 6 is an end view of one embodiment of the wiping element of the present invention.

A wiping element (or blade) 12 of the present invention is shown in cross section in FIG. 6. The wiping element 12 includes an insert end 16, a body portion 18, and a windshield contact end 20. As shown in FIG. 4, the insert end 16 of the wiping element 12 is engaged within the holder 10 as the holder 10 is secured within the wiper arm assembly. The unique shape of the holder 10 and the insert end 16 adapted to reside within the holder provide added support of the wiper element 12 within the holder 10. A fastener 22 may be secured to each end 24, 26 of the wiping element 12 which abuts the end of the holder 10 to keep the wiping element secured within the holder during operation of the windshield wiper system.

As further shown in FIG. 6, the insert end 16 of the wiping element 12 may be of a mushroom shape for added structural benefit when tightly secured within the holder 10. The holder 10 may be clamped around the insert end 16. The insert end 16 may also be extruded around a metal rod 28 which may run the length of the wiping element 12. Referring now to FIG. 5, the metal rod 28 provides a spine 30 within the insert end 16 of the wiping element 12, enabling the wiping element to be readily replaced by unthreading a threaded fastener 22 at each end 24, 26 of the threaded metal rod and reattaching the threaded fasteners to a replacement wiping element.

In another embodiment of the present invention, as shown in FIG. 7, the wiping element may be made of a high durometer rubber for the insert end 16 and a low durometer rubber for the body portion 18 and windshield contact end 20. For example, a low durometer of about 50 on the Shore A scale and a high durometer of about 75 or higher may be used. The high durometer insert end may be drilled and tapped for a helicoil insert 32 or similar configuration which enables the wiping element 12 to be retained within the holder 10 by a simple screw 34 and washer 36 arrangement as shown in FIG. 8.

It is thought that the replaceable wiping element of the present invention and many of its attendant advantages will be understood from the foregoing description. It will be apparent that various changes may be made in the form and construction of the components thereof without departing from the spirit and scope of the invention or sacrificing all of its material advantages. The forms of the invention hereinbefore described are merely preferred or exemplary embodiments thereof and should not be construed as limiting the scope of the invention.

What is claimed is:

1. A wiper assembly, comprising:

an elongated one-piece rubber wiping element having an insert portion defining a first longitudinal edge of said wiping element, and a windshield contact portion defining a second longitudinal edge of said wiping element, said insert portion of a substantially higher durometer rubber than said windshield contact portion thereby enabling said windshield contact portion to remain flexible to adapt to the contour of a windshield surface while said insert portion is relatively rigid, said wiping element having first and second ends;

an elongated metal rod forming a spine, said rod residing within a hollow portion of said insert portion that rims longitudinally and entirely through said insert portion of said wiping element, said rod having first and second threaded ends extending respectively from said first and second ends of said wiping element;

an elongated holder, said holder forming a longitudinal channel therein which slidably receives, in a longitudinal manner, and encloses the entire length of said insert portion having said rod therein;

a first threaded fastener engaging said first end of said rod; and a second threaded fastener engaging said second end of said rod, wherein said first and second fasteners secure and insert portion within said holder to prevent said wiping element from being detached longitudinally from said holder.

* * * * *

UNITED STATES PATENT AND TRADEMARK OFFICE
CERTIFICATE OF CORRECTION

PATENT NO. : 5,487,205  Page 1 of 2
DATED : January 30, 1996
INVENTOR(S) : Scherch et al.

It is certified that error appears in the above-indentified patent and that said Letters Patent is hereby corrected as shown below:

On the title page,
Item [57], delete three occurrences of "end" lines 2,3 & 4, and replace it in all three instances with --portion--.

In column 2, line 19, please delete "end" and replace it with -- portion --.

In column 2, line 20, please delete the two occurrences of "end" and replace it in both instances with --portion--.

In column 2, line 23, please delete "end" and replace it with --portion--.

In column 2, line 30, please delete "end" and replace it with --portion--.

In column 2, line 33, please delete "end" and replace it with --portion--.

In column 2, line 34, please delete "end" and replace it with --portion--.

UNITED STATES PATENT AND TRADEMARK OFFICE
CERTIFICATE OF CORRECTION

PATENT NO. : 5,487,205
DATED : January 30, 1996
INVENTOR(S) : Scherch et al.

It is certified that error appears in the above-indentified patent and that said Letters Patent is hereby corrected as shown below:

In column 2, line 37, after "within" please add --an otherwise hollow portion of--; delete "end" and replace it with --portion--; and after the word "enabling" add --portion--.

In column 2, line 44, please delete "end" and replace it with --portion--.

In column 2, line 45, please delete "end" and replace it with --portion--.

In column 3, line 10, please delete "rims" and replace it with --runs--.

Signed and Sealed this

Eighth Day of October, 1996

Attest:

BRUCE LEHMAN

Attesting Officer    Commissioner of Patents and Trademarks